United States Patent [19]
Walker et al.

[11] Patent Number: 5,875,537
[45] Date of Patent: Mar. 2, 1999

[54] APPARATUS FOR USE IN ASSEMBLING A STEERING WHEEL COVER, AN AIR BAG DEVICE AND A RETAINER PLATE INTO A SINGLE UNIT

[75] Inventors: Craig Anthony Walker, Cincinnati; Paul Willard Mellander, Dayton, both of Ohio

[73] Assignee: Omega Automation, Inc., Dayton, Ohio

[21] Appl. No.: 754,861

[22] Filed: Nov. 22, 1996

[51] Int. Cl.$^6$ ............................. B23P 11/00; B23P 19/04
[52] U.S. Cl. ............................ 29/464; 29/252; 29/281.3; 29/446; 29/453; 29/709
[58] Field of Search ................................. 29/243.5, 251, 29/252, 446, 453, 464, 281.1, 281.3, 281.5, 709

[56] References Cited

U.S. PATENT DOCUMENTS

| | | | |
|---|---|---|---|
| 4,877,264 | 10/1989 | Cuevas | 280/731 |
| 5,673,471 | 10/1997 | Blaidsdell | 29/423 |
| 5,706,707 | 1/1998 | Sanders | 74/552 |
| 5,771,572 | 6/1998 | Mellander | 29/701 |

*Primary Examiner*—S. Thomas Hughes
*Assistant Examiner*—Steve Blount
*Attorney, Agent, or Firm*—Killworth, Gottman, Hagan & Schaeff, L.L.P.

[57] ABSTRACT

An apparatus is provided for use in assembling a steering wheel cover, an air bag device and a retainer plate into a single unit. The air bag device includes an inflatable cushion portion and a base plate portion. The steering wheel cover includes a central portion and a plurality of side portions which extend out from the central portion to define with the central portion a pocket for receiving the air bag device. At least one of the side portions has a tab for lockingly engaging the retainer plate. The apparatus comprises: a receiving nest adapted to receive the steering wheel cover; a first expanding device for engaging a first side portion of the steering wheel cover and moving the first side portion outwardly to permit the air bag device to be placed within the pocket; and engagement apparatus for engaging the base plate portion and moving the base plate portion toward the central portion of the steering wheel cover to set the height of the base plate portion within the pocket and after the retainer plate has been positioned on the moved base plate portion effecting engagement of the tab with the retainer plate.

21 Claims, 7 Drawing Sheets

APPARATUS FOR USE IN ASSEMBLING A STEERING WHEEL COVER, AN AIR BAG DEVICE AND A RETAINER PLATE INTO A SINGLE UNIT

BACKGROUND OF THE INVENTION

The present invention relates to an apparatus for use in assembling a steering wheel cover, an air bag device and a retainer plate into a single unit.

It is known to manually place air bag devices into steering wheel covers. Such operations generally take place without the aid of automated apparatus for assisting in the placement process. Because such operations are manually performed, throughput rates are low and assembly of the parts is not always performed consistently. Hence, these prior art manual processes are time consuming, inefficient and at times not completely effective and, thus, not preferred.

Accordingly, there is a need in the art for apparatus to assist in assembling a steering wheel cover, an air bag device and a retainer plate into a single unit.

SUMMARY OF THE INVENTION

This need is met by the present invention whereby apparatus is provided for use in assembling a steering wheel cover, an air bag device and a retainer plate into a single unit. Further provided is an improved method for assembling a steering wheel cover, an air bag device and a retainer plate into a single unit.

In accordance with a first aspect of the present invention, an apparatus is provided for assembling a steering wheel cover, an air bag device and a retainer plate into a single unit. The air bag device includes an inflatable cushion portion and a base plate portion. The steering wheel cover includes a central portion and a plurality of side portions which extend out from the central portion to define with the central portion a pocket for receiving the air bag device. At least one of the side portions has a tab for lockingly engaging the retainer plate. The apparatus comprises: a receiving nest adapted to receive the steering wheel cover; a first expanding device for engaging a first side portion of the steering wheel cover and moving the first side portion outwardly to permit the air bag device to be placed within the pocket; engagement apparatus including first engagement structure for engaging the base plate portion and moving the base plate portion toward the central portion of the steering wheel cover to set the height of the base plate portion within the pocket, and second engagement structure for moving either the first side portion or another of the side portions inwardly toward the central portion of the steering wheel cover. After the retainer plate has been positioned on the moved base plate portion, the first engagement structure further effects engagement of the tab with the retainer plate.

Preferably, the first expanding device comprises a reciprocating member and a pulling device which is connected to the reciprocating member for movement with the reciprocating member. The reciprocating member is adapted to move between a first position adjacent to the receiving nest and a second position away from the receiving nest. The pulling device includes a rotatable pulling member capable of rotating between an engagement position and a remote position such that the pulling member is adapted to engage and expand the first side portion when it is positioned in the engagement position and the reciprocating member is moved from the first position to the second position. The first expanding device further includes, in the illustrated embodiment, a pneumatic cylinder unit connected to the reciprocating member for effecting movement of the reciprocating member from the first position to the second position and vice versa. The pulling device further includes a rotary actuator coupled to the pulling member for effecting rotation of the pulling member from the engagement position to the remote position and vice versa.

The first side portion comprises a first inner side portion. The steering wheel cover may further include second, third and fourth inner side portions and first, second, third and fourth outer side portions.

The first engagement structure comprises an overhead press and the second engagement structure comprises at least one side portion press device. The overhead press has a piston engagement member adapted to move toward the air bag device after the air bag device has been placed within the steering wheel cover pocket such that the piston engagement member engages and moves the base plate portion toward the central portion of the steering wheel cover to set the height of the base plate portion within the pocket. The overhead press further includes a piston/cylinder unit having a piston coupled to the piston engagement member. The apparatus also includes convention control valve apparatus for supplying air to and venting air from the overhead press piston/cylinder unit. The control valve apparatus includes a pneumatic regulator device which allows the pressure in the piston/cylinder unit to be varied so as to allow the pressing force of the piston engagement member to be changed.

The at least one side portion press device has a press device engagement member adapted to move between a side portion engagement position and a remote position. The press device engagement member moves the first outer side portion toward the air bag device as it moves to the side portion engagement position. The overhead press engagement member is further adapted to move toward the nest after the retainer plate has been positioned over the moved base plate portion to effect locking engagement of the tab with the retainer plate.

In one embodiment, a plurality of side portion press devices are provided.

The engagement apparatus preferably further comprises at least one tuck blade which is adapted to move inwardly toward a corner portion of the steering wheel cover to engage a section of the cushion portion extending out of the steering wheel cover pocket to push the extended cushion section into the steering wheel cover pocket.

The apparatus preferably further comprises optical sensor apparatus for sensing the presence or absence of one or more tabs on the steering wheel cover.

In accordance with a second aspect of the present invention, a method is provided for assembling a steering wheel cover, an air bag device and a retainer plate into a single unit. The air bag device includes an inflatable cushion portion and a base plate portion. The steering wheel cover includes a central portion and a plurality of side portions which extend out from the central portion to define with the central portion a pocket for receiving the air bag device. At least one of the side portions has a tab for lockingly engaging the retainer plate. The method comprises the steps of: positioning the steering wheel cover on a nest; moving a first steering wheel cover side portion outwardly; placing the air bag device within the pocket; moving at least one of the first side portion and another of the side portions inwardly toward the central portion of the steering wheel cover; placing the retainer plate over the base plate portion of the air bag device; and effecting engagement of the tab with the retainer plate via a press.

The step of moving a first steering wheel cover side portion outwardly may comprise the step of engaging the first steering wheel cover side portion with a pulling device and moving the pulling device away from the nest via a reciprocating member.

The method preferably further includes the steps of: providing at least one tuck blade; and moving the tuck blade inwardly toward a corner portion of the steering wheel cover to engage a section of the cushion portion extending out of the steering wheel cover pocket to push the extended cushion section into the pocket.

The method preferably also includes the step of moving the base plate portion toward the central portion of the steering wheel cover before the step of placing a retainer plate over the base plate portion.

In accordance with a third aspect of the present invention, an apparatus is provided for expanding a steering wheel cover to allow an air bag device to be placed within the steering wheel cover. The air bag device includes an inflatable cushion portion and a base plate portion. The steering wheel cover includes a central portion and a plurality of side portions which extend out from the central portion to define with the central portion a pocket for receiving the air bag device. The apparatus comprises: a receiving nest adapted to receive the steering wheel cover; and a first expanding device for engaging a first side portion of the steering wheel cover and moving the first side portion outwardly to permit the air bag device to be manually placed within the pocket.

Accordingly, it is an object of the present invention to provide an apparatus for use in assembling a steering wheel cover, an air bag device and a retainer plate into a single unit. It is further an object of the present invention to provide a method for assembling a steering wheel cover, an air bag device and a retainer plate into a single unit. These and other objects and advantages of the present invention will be apparent from the following description, the accompanying drawings and the appended claims.

DETAILED DESCRIPTION OF THE PREFERRED EMBODIMENT

Figure 1:
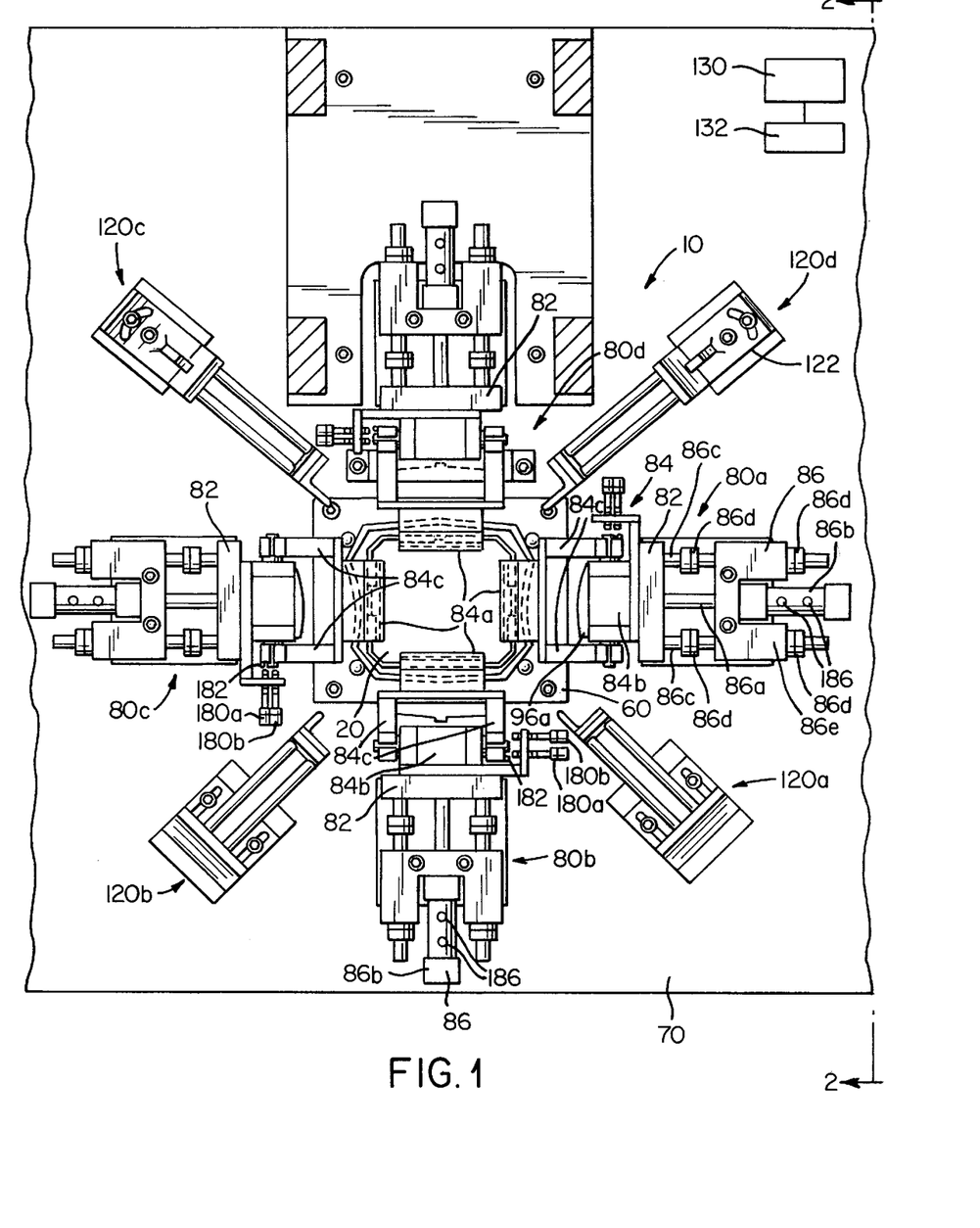
FIG. 1 is a top view of apparatus constructed in accordance with the present invention for use in assembling a steering wheel cover, an air bag device and a retainer plate into a single unit with an overhead press of the apparatus removed.
Figure 13:
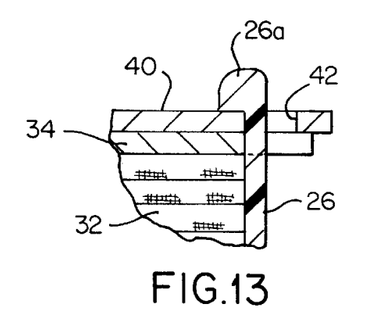
FIG. 13 is a view taken along view line 13—13 in FIG. 10.

In FIG. 1, an apparatus 10 is shown constructed in accordance with the present invention for assembling a steering wheel cover 20, an air bag device 30 and a retainer plate 40 into a single unit 50. The steering wheel cover 20 includes a lower central portion 23 and a plurality of inner side portions 22a–22d which extend out from the central portion 23 to define with the central portion 23 a pocket 24 for receiving the air bag device 30, see FIG. 4. In the illustrated embodiment, each of the inner side portions 22a–22d is provided with at least one tab 26 for lockingly engaging the retainer plate 40, see FIG. 13. The steering wheel cover 20 further includes first, second, third and fourth outer side portions 24a–24d. The air bag device 30 is conventional in design and includes an inflatable cushion portion 32 and a base plate portion 34, see FIGS. 7 and 14.

Figure 2:
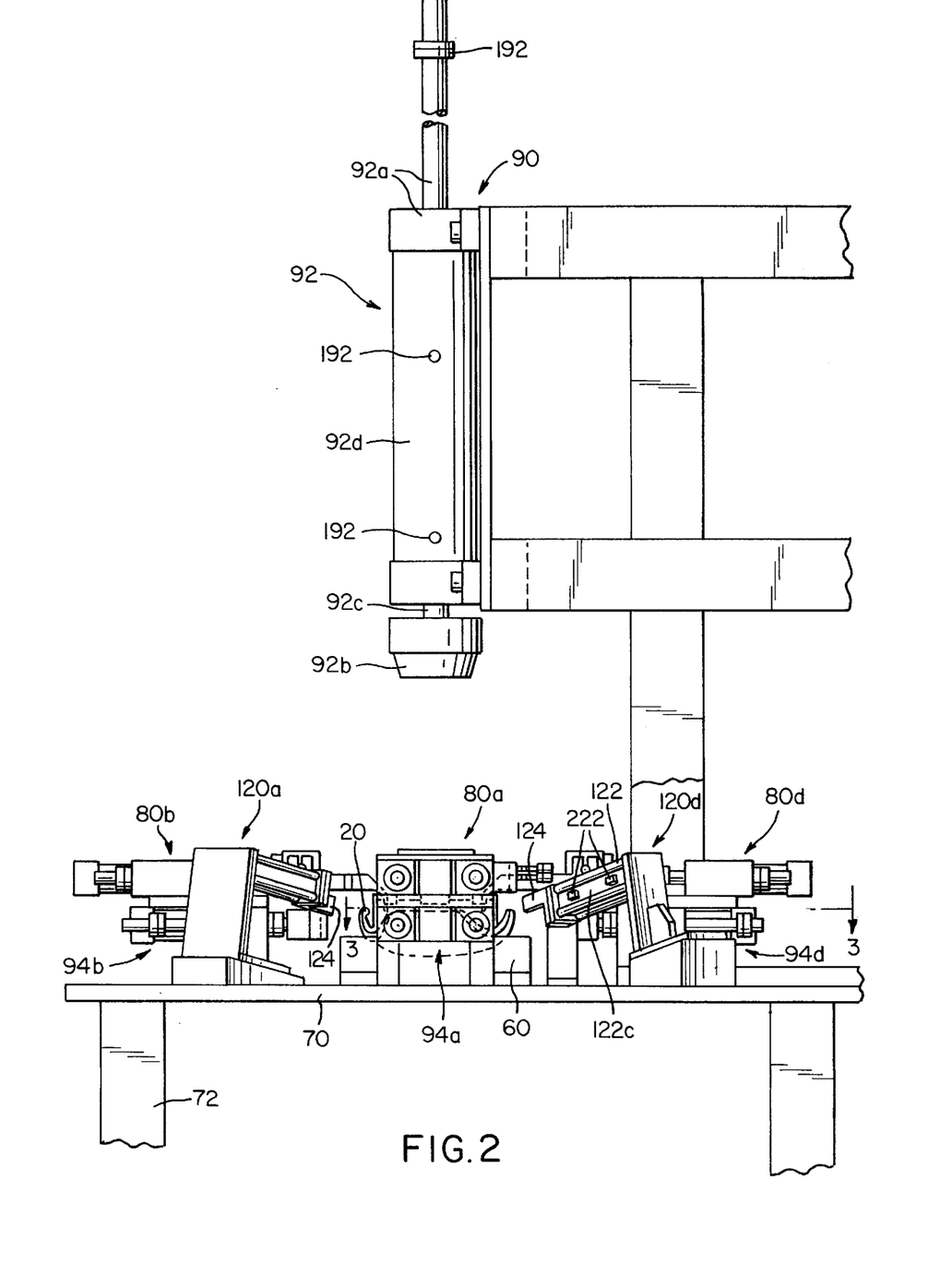
FIG. 2 is a view taken along view line 2—2 in FIG. 1.
Figure 4:
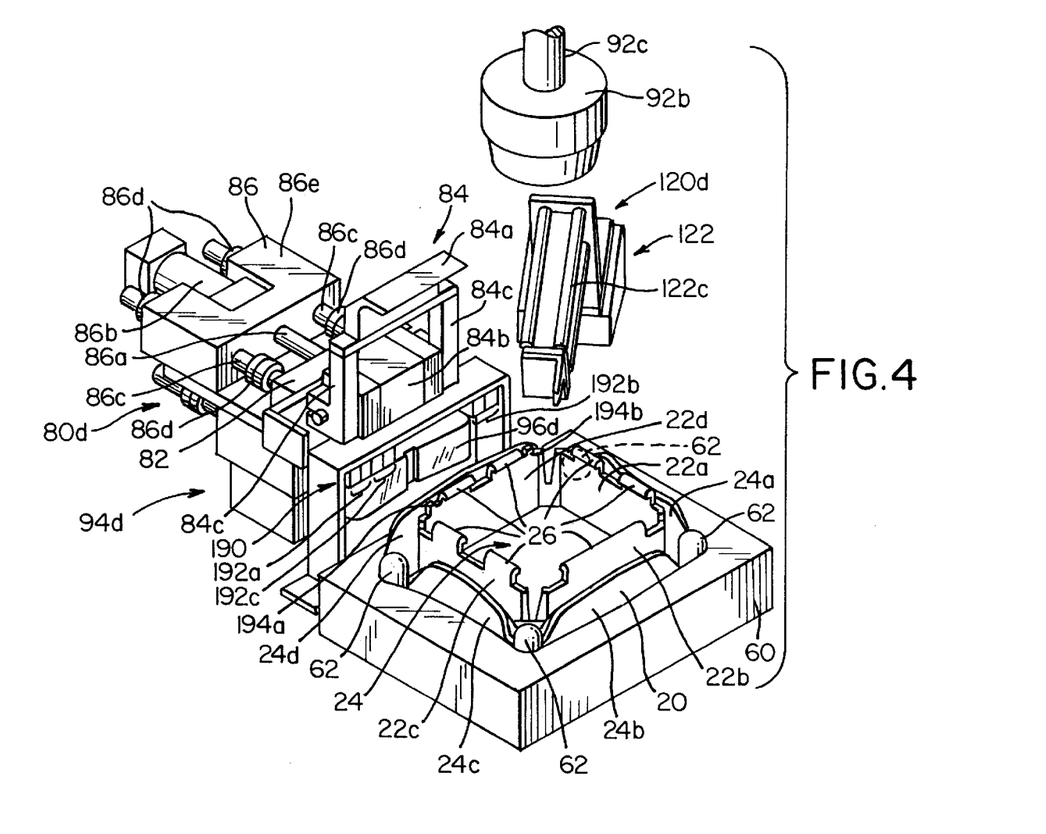
FIG. 4 is a perspective view of one expanding device, one side portion press device, one tuck blade assembly, a portion of the overhead press, and the nest of the apparatus illustrated in FIG. 1 with the pulling member of the expanding device shown in its remote position.

The apparatus 10 includes a receiving nest 60 supported upon an upper surface 70 of a structural frame 72 of the apparatus 10, see FIGS. 2 and 4. The nest 60 is adapted to releasably receive the steering wheel cover 20. The nest 60 includes four upwardly extending engagement pins 62 which locate and releasably receive the steering wheel cover 20 which is manually placed in the nest 60.

Figure 5:
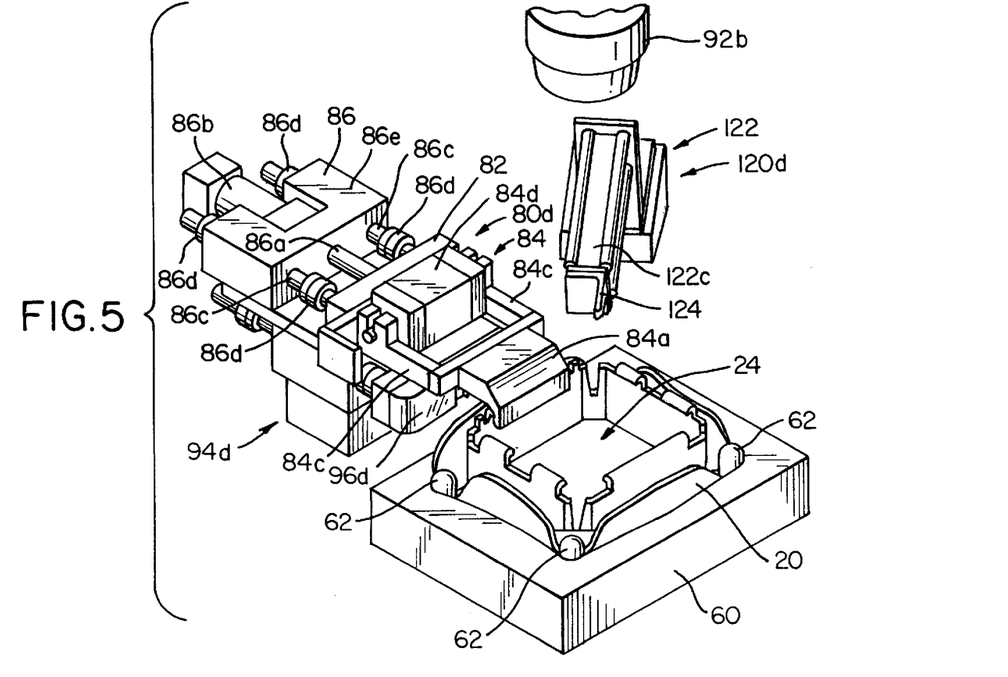
FIG. 5 is a perspective view similar to FIG. 4 but with the pulling member shown in its engagement position.

The apparatus 10 further includes first, second, third and fourth expanding devices 80a–80d which engage the inner side portions 22a–22d of the steering wheel cover 20 and move the inner side portions 22a–22d outwardly to permit the air bag device 30 to be placed manually within the pocket 24, see FIGS. 1, 4 and 5. Each of the expanding devices 80a–80d comprises a reciprocating member 82 and a pulling device 84 which is fixedly connected to the reciprocating member 82 for linear back and forth movement with the reciprocating member 82. The reciprocating member 82 is adapted to move between a first position adjacent to the receiving nest 60, see FIGS. 4 and 5, and a second position away from the receiving nest 60. the illustrated embodiment, each expanding device 80a–80d further includes a pneumatic piston/cylinder drive unit 86 fixedly connected to the reciprocating member 82 for effecting movement of the reciprocating member 82 from the first position to the second position and vice versa. The pneumatic drive unit 86 includes a piston 86a, a pneumatic cylinder 86b from which the piston 86a extends, and first and second guide rods 86c which are fixedly connected to the reciprocating member 82. The drive units 86 further include linear bearings (not shown) incorporated into a main body portion 86e of the drive unit 86 which allow the guide rods 86c to move back and forth relative to the main body portion 86e. Adjustable stops 86d are provided on the guide rods 86c which define the maximum distances the reciprocating member 82 can move and, hence, define the location of the reciprocating member 82 relative to the main body portion 86e when the member 82 has moved to the first position and the location of the reciprocating member 82 relative to the main body portion 86e when the member 82 has moved to the second position. It is further contemplated by the present invention that each of the pneumatic piston/cylinder drive units 86 may be replaced by a conventional servomotor or stepper motor for effecting movement of its associated reciprocating member 82 from the first position to the second position and vice versa.

Figure 6:
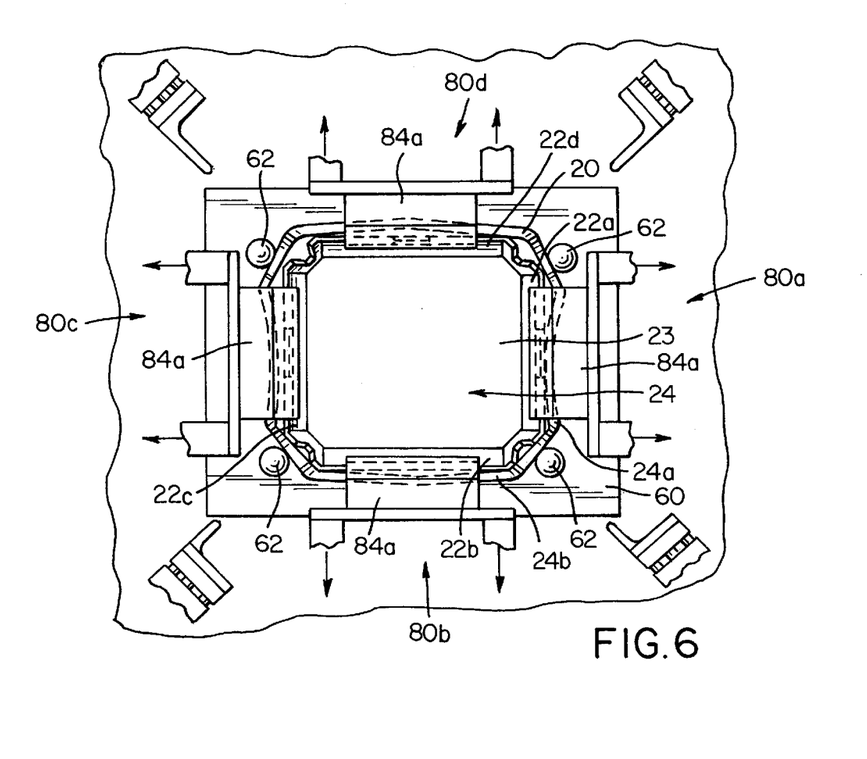
FIG. 6 is a plan view illustrating the pulling members in their engagement positions and having been moved by their respective reciprocating members outwardly such that the steering wheel cover side portions are expanded.

The pulling device 84 includes a generally L-shaped rotatable pulling member 84a which is capable of rotating between an engagement position, shown in FIG. 5, and a remote position, shown in FIG. 4. The pulling members 84a engage and expand the side portions 22a–22d when they are positioned in their engagement positions and their respective reciprocating members 82 are moved from their first positions to their second positions, see FIG. 6. Hence, the inner side portions 22a–22d of the steering wheel cover 20 are shown expanded in FIG. 6 to receive an air bag device 30. The pulling device 84 further includes a rotary actuator 84b, a pneumatic rotary vane actuator in the illustrated embodiment, which is fixedly connected to the pulling member 84a via coupling arms 84c for effecting rotation of the pulling member 84a from the engagement position to the remote position and vice versa.

Figure 7:
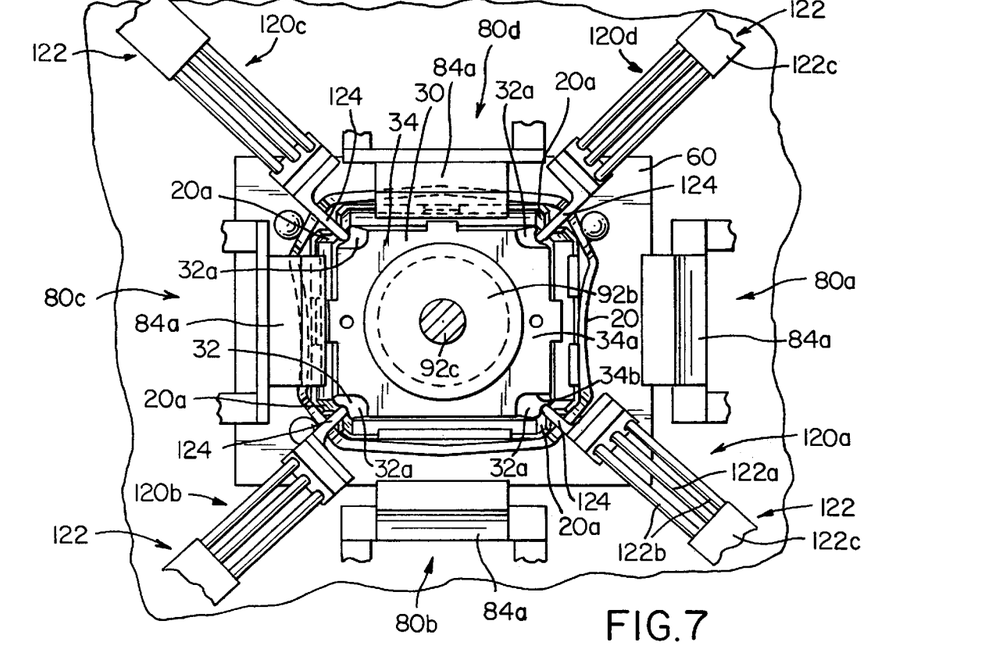
FIG. 7 is a plan view illustrating the engagement member of the overhead press in an extended position and the tuck blades extended inwardly and with two of the pulling members moved to their remote positions.

The apparatus 10 also includes engagement apparatus 90 which engages the base plate portion 34 of the air bag device 30 and moves the base plate portion 34 toward the central portion 23 of the steering wheel cover 20 to set the height of the base plate portion 34 within the pocket 24, see FIG. 7. After the retainer plate 40 has been positioned on the moved base plate portion 34, the engagement apparatus 90 further serves to effect locking engagement of the tabs 26 on the inner side portions 22a 22d with receiving openings 42 in the retainer plate 40, see FIGS. 9, 10, 12 and 13.

Figure 11:
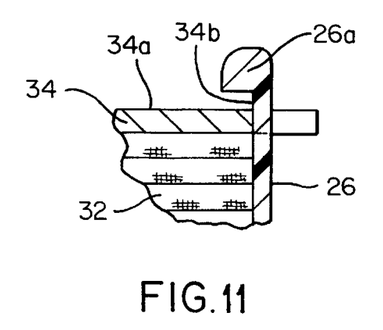
FIG. 11 is a view taken along view line 11—11 in FIG. 8.
Figure 12:
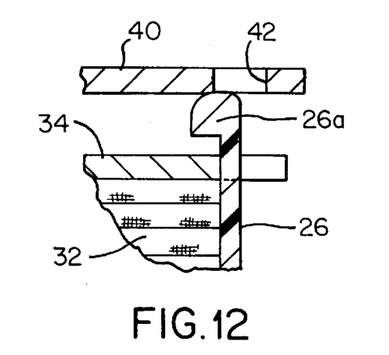
FIG. 12 is a view taken along view line 12—12 in FIG. 9.

The engagement apparatus 90 includes first engagement structure comprising an overhead press 92 and second engagement structure comprising first, second, third and fourth side portion press devices 94a–94d. The overhead press 92 comprises a pneumatic piston/cylinder unit 92a having a piston 92c and a cylinder 92d from which the piston 92c extends, see FIG. 2. The press 92 further includes a piston engagement member 92b which is fixedly connected to a distal end of the piston 92c. The piston engagement member 92b moves toward the air bag device 30 after the air bag device 30 has been placed within the steering wheel cover pocket 24 and engages and moves the base plate portion 34 of the air bag device 30 toward the central portion 23 of the steering wheel cover 20 to set the height of the base plate portion 34 relative to the central portion 23 of the steering wheel cover 20. The tabs 26 on the inner side portions 22a–22d are generally L-shaped and have upper tab portions 26a, see FIG. 11. The base plate portion 34 is moved downwardly so that it is spaced from the central portion 23 a distance sufficient to allow the upper tab portions 26a to extend over the base plate portion edge 34b after the inner side portions 22a–22d have been released by the pulling members 84a of the pulling devices 84, see FIGS. 8 and 11.

The distance that the engagement member 92b can move downwardly can be varied via collar 192.

Figure 3:
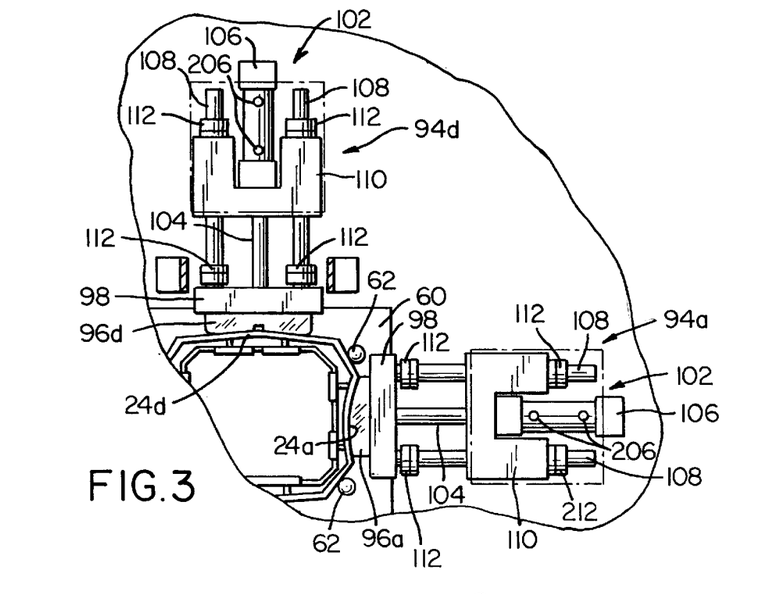
FIG. 3 is a view taken along view line 3—3 in FIG. 2.
Figure 8:
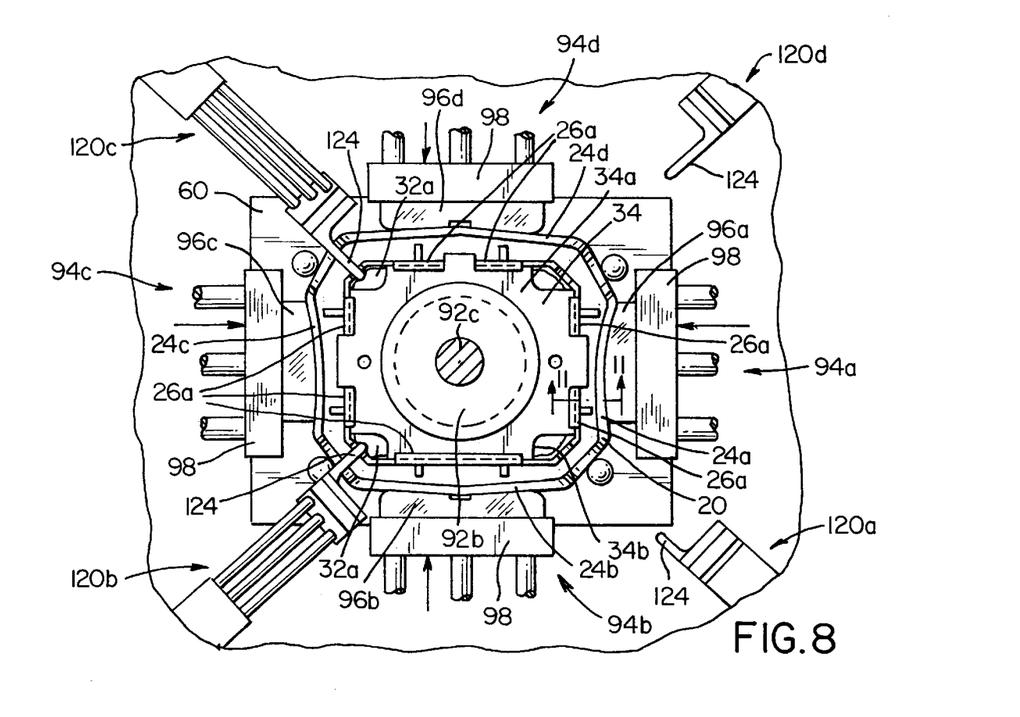
FIG. 8 is a plan view illustrating the engagement member of the overhead press in an extended position, the engagement members of the side portion press devices in their side portion engagement positions and with the expanding devices not shown.
Figure 9:
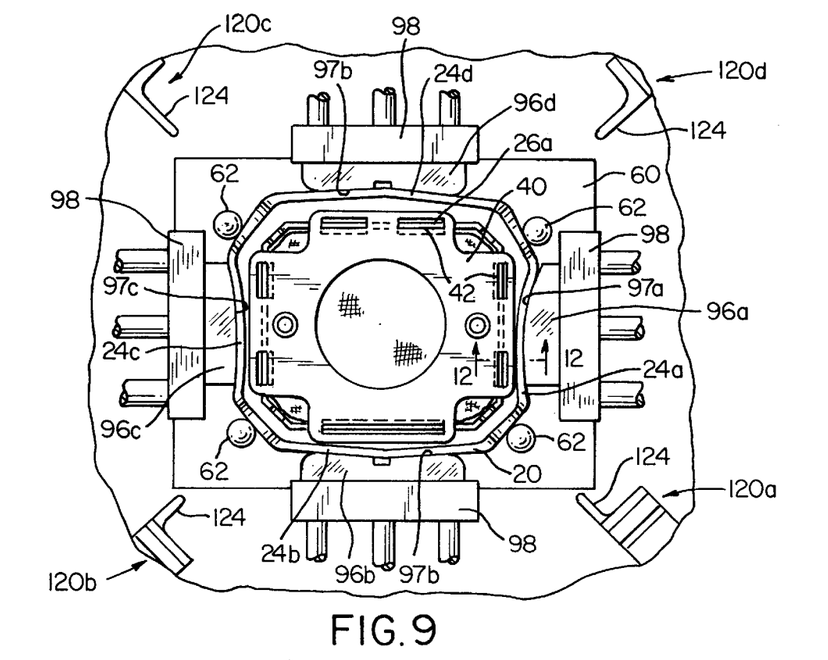
FIG. 9 is a plan view illustrating a retainer plate positioned on top of tabs on the steering wheel cover and with the expanding devices not shown.

The side portion press devices 94a–94d include polymeric engagement members 96a–96d, see FIGS. 3 and 8. The engagement members 96a–96d move from a remote position, see FIG. 14, to a side portion engagement position, see FIG. 8, to engage the outer side portions 24a–24d of the steering wheel cover 20 after the inner side portions 22a–22d have been released by the pulling members 84a to ensure that the inner and outer side portions 22a–22d and 24a–24d have returned to their initial upright positions and to assist in moving the upper tab portions 26a over the edge 34b of the base plate portion 34.

The press devices 94a–94d are located below the expanding devices 80a–80d, see FIGS. 2, 4 and 5. The polymeric engagement members 96a and 96c of the press devices 94a and 94c are fixedly connected to reciprocating members 98, see FIG. 3. Each of the engagement members 96a and 96c has a generally curvilinear outer surface 97a which corresponds to the shape of side surfaces of the outer side portions 24a and 24c of the steering wheel cover 20, see FIG. 9. The polymeric engagement members 96b and 96d of the press devices 94b and 94d are also fixedly connected to reciprocating members 98. Each of the engagement members 96b and 96d has a generally V-shaped outer surface 97b which corresponds to the shape of the side surfaces of the outer side portions 24b and 24d of the steering wheel cover 20, see FIG. 9.

Figure 14:
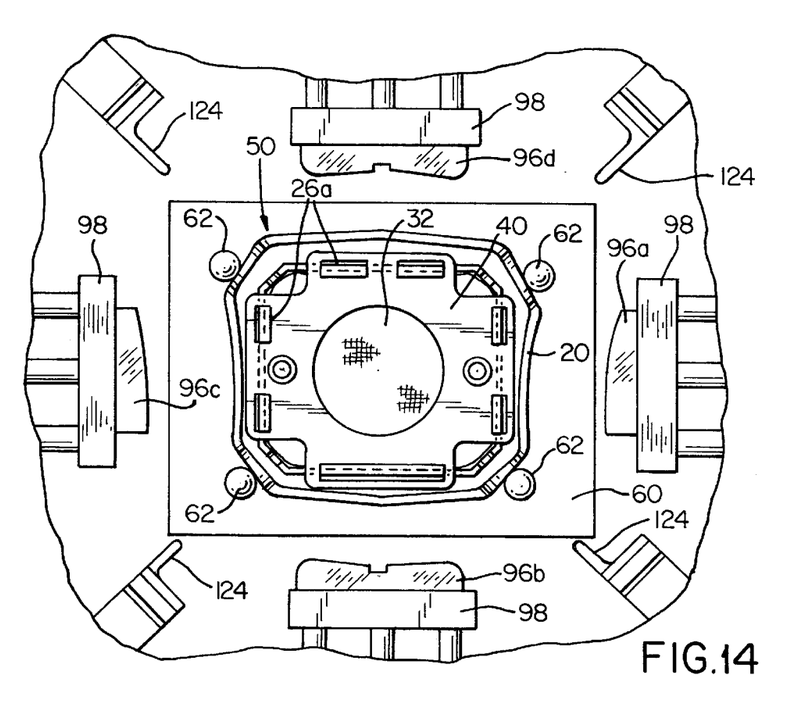
FIG. 14 is a plan view illustrating the engagement members of the side portion press devices in their remote positions, the tuck blades in their remote positions and the steering wheel cover, the air bag device and the retainer plate assembled as a single unit.

Each press device 94a–94d further includes a pneumatic piston/cylinder drive unit 102, see FIG. 3, fixedly connected to the reciprocating member 98 for effecting movement of the reciprocating member 98 from a first position adjacent to the nest 60, as shown in FIG. 8, to a second remote position spaced from the nest 60, as shown in FIG. 14, and vice versa. The pneumatic drive unit 102 includes a piston 104, a pneumatic cylinder 106 from which the piston 104 extends, and first and second guide rods 108 which are fixedly connected to the reciprocating member 98. The drive units 102 further include linear bearings (not shown) incorporated into a main body portion 110 of the drive unit 102 which allow the guide rods 108 to move back and forth relative to the main body portion 110. Adjustable stops 112 are provided on the guide rods 108 which define the maximum distances the reciprocating member 98 can move and, hence, define the location of the reciprocating member 98 relative to the main body portion 110 when the member 98 has moved to the first position and the location of the reciprocating member 98 relative to the main body portion 110 when the member 98 has moved to the second position. It is further contemplated that each of the drive units 102 may be replaced by a conventional servomotor or stepper motor.

The engagement apparatus 90 further comprises first, second, third and fourth tuck blade assemblies 120a–120d, see FIG. 1. Each tuck blade assembly 120a–120d includes a pneumatic piston/cylinder unit 122 having a piston 122a and guide rods 122b fixedly connected to a tuck blade 124 and a cylinder 122c from which the piston 122a and the guide rods 122b extend, see FIG. 7. As will be discussed more explicitly below, the tuck blades 124 move inwardly to a first position so as to extend through a corner portion 20a of the steering wheel cover 20 to engage a section 32a of the cushion portion 32 extending out of the steering wheel cover pocket 24 to push the cushion portion section 32a into the pocket 24, see FIG. 7. The tuck blades 124 are also movable to a second remote or home position, see FIG. 14.

The apparatus further comprises a conventional control processor 130 and conventional control valve apparatus 132 comprising a number of control valves. The valves comprising the valve apparatus 132 are controlled via the processor 130 so as to supply air to and vent air from the pneumatic drive units 86, the rotary actuators 84b, the pneumatic piston/cylinder unit 92*a*, the pneumatic drive units 102, and the piston/cylinder units 122 at appropriate times during a given cycle. A single valve may be provided for each of the units 86, 84*b*, 92*a*, 102 and 122 or two or more units may be associated with a single valve. The number and type of valves used will be readily apparent to one skilled in the art.

A magnetic band (not shown) is provided on each of the pistons 86*a*, 92*c*, 104 and 122*a* of units 86, 92*a*, 102, and 122. Two magnetic reed switches 186 are provided on each cylinder 86*b* of the pneumatic drive units 86, see FIG. 1, and sense movement of the magnetic band on the piston 86*a* as the piston 86*a* moves its associated reciprocating member 82 to either its first or second position. Two magnetic reed switches 192 are provided on the pneumatic piston/cylinder unit 92*a* for sensing movement of the magnetic band on the piston 92*c* as the piston 92*c* moves the engagement member 92*b* to a downward position where it engages either the base plate portion 34 or the retainer plate 40 or an upward or remote position, see FIG. 2. Two magnetic reed switches 206 are provided on each cylinder 106 of the pneumatic drive units 102, see FIG. 3, for sensing movement of the magnetic band on the piston 104 as the piston 104 moves its associated reciprocating member 98 to either its first or second position. Two magnetic reed switches 222 are provided on each cylinder 122*c* of the piston/cylinder units 122, see FIG. 2, for sensing movement of the magnetic band on the piston 122*a* as the piston 122*a* moves its associated tuck blade 124 to its first or second position. Signals generated by the reed switches 186, 192, 206 and 222 are provided to the processor 130. The signals generated by the reed switches 186, 192, 206 and 222 indicate to the processor 130 that various steps in the cycle have been completed so that the processor 130 can initiate subsequent steps.

Positioned adjacent to each of expanding devices 80*a*–80*d* are first and second conventional inductive proximity sensors 180*a* and 180*b*, see FIG. 1. As discussed above, each pulling device 84 includes coupling arms 84*c* for coupling a rotary actuator 84*b* with a pulling member 84*a*. The coupling arms 84*c* are provided with a pin 182 which is sensed by the sensor 180*a* when the pulling member 84*a* is in its engagement position, see FIG. 1, or by sensor 180*b* which the pulling member 84*a* is in its remote position. Signals generated by the proximity sensors 180*a* and 180*b* are provided to the processor 130. The proximity sensor signals indicate to the processor 130 that a given step involving movement of the pulling members 84*a* has been completed.

Optical sensor apparatus 190 is provided for sensing the presence of a steering wheel cover 20 in the nest 60 as well as the presence of tabs 194*a* and 194*b* which may be provided on the steering wheel cover 20, see FIG. 4. The sensor apparatus 190 comprises first, second and third photoelectric sensors 192*a*–192*c* which generate signals received by the processor 130. The third sensor 192*c* generates a light beam which is reflected back to the sensor 192*c* when a steering wheel cover 20 is present in the nest 60. Hence, the sensor 192*c* generates a signal to the processor 130 when it senses the presence of a steering wheel cover 20 in the nest 60. If a cover 20 is not present, the beam is not reflected back to the sensor 192*c* and a signal is not generated by the sensor 192*c* to the processor 130. The first sensor 192*a* generates a signal to the processor 130 if the steering wheel cover 20 is provided with a tab 194*a*. The second sensor 192*b* generates a signal to the processor 130 if the steering wheel cover 20 is provided with a tab 194*b*. Two tabs 194*a* and 194*b* are provided on the cover shown in FIG. 4. However, the covers 20 may be provided without any tabs, with only one tab or with two or more tabs. The presence or absence of the tabs 194*a* and 194*b* could be used for inventory control and/or could signify different steering wheel cover designs. It is also contemplated that voids, cavities or openings (not shown) in the steering wheel cover 20 could be used in place of the tabs which would be sensed by appropriate sensors such as photosensors to indicate the identity and/or design of the cover 20.

The operation of the apparatus 10 will now be described. Initially, a steering wheel cover 20 is manually positioned in the nest 60, see FIG. 4. Thereafter, the sensor apparatus 190 senses the presence of the cover 20 and further senses whether the cover 20 is provided with tabs 194*a* and 194*b*.

The reciprocating members 82 of the expanding devices 80*a*–80*d* are initially positioned in their second positions such that they are spaced from the receiving nest 60. Further, the pulling members 84*a* are initially positioned in their remote positions.

After the cover 20 has been loaded into the nest 60, the reciprocating members 82 of the expanding devices 80*a*–80*d* are moved to their first positions, see FIG. 4. Further, the pulling members 84*a* are caused to rotate, 900 in the illustrated embodiment, from their remote positions to their engagement positions, see FIGS. 1, 2, 5 and 6. Next, the reciprocating members 82 and, hence, the pulling members 84*a* are moved away from the nest 60 via the drive units 86 such that the side portions 22*a*–22*d* are expanded. For example, the pulling members 84*a* may move approximately 0.5 inch. An air bag device is then manually positioned within the pocket 24 of the expanded steering wheel cover 20 with the inflatable cushion portion 32 located adjacent to the lower central portion 23 of the steering wheel cover 20. Thus, the base plate portion 34 is positioned above the cushion portion 32, see FIGS. 7 and 11.

Next, the engagement member 92*b* of the overhead press 92 is moved downwardly and engages the base plate portion 92 to set the height of the base plate portion 34 relative to the central portion 23 of the steering wheel cover 20, see FIG. 7. The tuck blades 124 are then moved inwardly to a first position so as to extend through the corner portions 20*a* of the steering wheel cover 20 to engage cushion portion sections 32*a* which might be extending out of the steering wheel cover pocket 24 to push the extending cushion sections 32*a* back into the pocket 24. Thereafter, the pulling members 84*a* are caused to rotate from their engagement positions to their remote positions, thereby releasing the inner side portions 22*a*–22*d*. In FIG. 7, the pulling members 84*a* of the first and second expanding devices 80*a* and 80*b* are shown in their remote positions while the pulling members 84*a* of the third and fourth expanding devices 80*c* and 80*d* are shown not yet rotated from their engagement positions to their remote positions.

After the pulling members 84*a* have been moved to their remote positions, the engagement members 96*a*–96*d* of the side portion press devices 94*a*–94*d* are moved from their remote positions to their side portion engagement positions, see FIG. 8. The engagement members 96*a*–96*d* engage the outer side portions 24*a*–24*d* and push those portions 24*a*–24*d* inwardly, thereby ensuring that the inner and outer side portions 22*a*–22*d* and 24*a* 24*d* have returned to their initial upright positions. By engaging the outer side portions 24*a*–24*d*, the engagement members 96*a*–96*d* further serve to move any of the upper tab portions 26*a* which may have not yet moved over the edge 34*b* of the base plate portion 34, see also FIG. 11. Next, the tuck blades 124 are moved outwardly to their remote positions. In FIG. 8, the tuck blades 124 of the first and fourth tuck blade assemblies 120a and 120d are shown retracted while the tuck blades 124 of the second and third assemblies 120b and 120c are shown not yet moved to their retracted positions.

After the upper tab portions 26a have moved over the edge 34b of the base plate portion 34, the engagement member 92b of the overhead press 92 is moved upward. A retainer plate 40 is then manually placed on top of the base plate portion 34, see FIGS. 9 and 12. The engagement member 92b of the overhead press 92 is then moved downwardly to engage the retainer plate 40 and move the retainer plate 40 downwardly so that the upper tab portions 26a extend through the openings 42 provided in the retainer plate 40 to lockingly engage with the retainer plate 40, see FIGS. 10 and 13. In the illustrated embodiment, the engagement member 92b is moved to generally the same vertical position it was in when it engaged the base plate portion 34. Of course, the vertical distance that the member 92b travels to engage the retainer plate 40 could be varied. Also, the pressing force of the member 92b may be varied via a conventional pneumatic regulator device associated with the valve apparatus 132.

Figure 10:
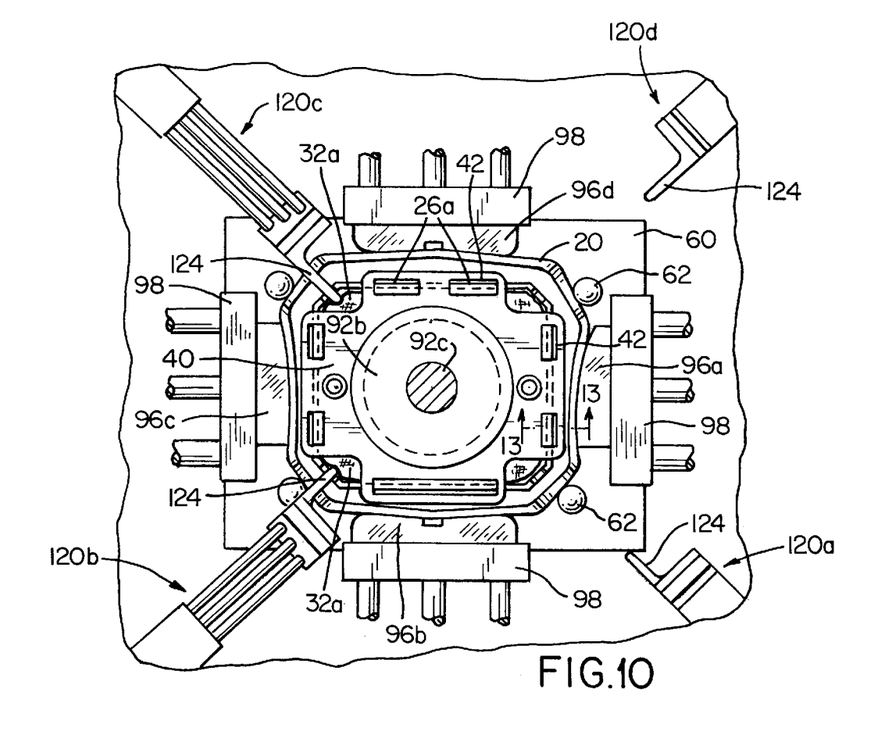
FIG. 10 is a plan view illustrating the engagement member of the overhead press in an extended position so as to effect engagement of the steering wheel cover tabs with openings provided in the retainer plate.

The tuck blades 124 are then moved inwardly to push any cushion sections 32a extending out of steering wheel cover pocket 24 back into the pocket 24. Thereafter, the tuck blades 124 are moved outwardly to their remote positions. In FIG. 10, the tuck blades 124 of the first and fourth tuck blade assemblies 120a and 120d are shown retracted while the tuck blades of the second and third assemblies 120b and 120c are shown not yet moved to their remote positions. Finally, the engagement member 92b of the overhead press 92 is moved upwardly to its home position, shown in FIG. 2, and the engagement members 96a–96d of the side portion press devices 94a–94d are moved to their remote positions, see FIG. 14. The assembled unit 50 comprising the steering wheel cover 20, the air bag device 30 and the retainer plate 40 is illustrated in FIG. 14.

It is additionally contemplated that the upper surface 70 of the apparatus 10 may be mounted on a folding engine such as the one disclosed in U.S. Pat. No. 5,575,748, the disclosure of which is hereby incorporated by reference.

It is also contemplated that the side portion press devices 94a–94d could be configured so that their engagement members 96a–96d engage only the outer surfaces of the inner side portions 22a–22d of the cover 20 rather than the outer side portions 24a–24d.

Having described the invention in detail and by reference to the preferred embodiments thereof, it will be apparent that other modifications and variations are possible without departing from the scope of the invention defined in the appended claims. For example, it is contemplated that the pulling members 84a could rotate through an angle other than 90°, e.g., 150° or 180°, as they move from their remote positions to their engagement positions and vice versa. By rotating the pulling members 84a through a larger angle, i.e. 150° or 180°, better access may be provided to load and remove the cover 20, the device 30 and the plate 40.

What is claimed is:

1. An apparatus for use in assembling a steering wheel cover, an air bag device and a retainer plate into a single unit, said air bag device including an inflatable cushion portion and a base plate portion, said steering wheel cover including a central portion and a plurality of side portions which extend out from said central portion to define with said central portion a pocket for receiving said air bag device, and at least one of said side portions having a tab for lockingly engaging said retainer plate, said apparatus comprising:

a receiving nest adapted to receive said steering wheel cover;

a first expanding device for engaging a first side portion of said steering wheel cover and moving said first side portion outwardly to permit said air bag device to be placed within said pocket; and engagement apparatus including first engagement structure for engaging said base plate portion and moving said base plate portion toward said central portion of said steering wheel cover to set a predetermined height of said base plate portion within said pocket and second engagement structure for moving at least one of said first side portion and another of said side portions inwardly toward said central portion of said steering wheel cover, and after said retainer plate has been positioned on said moved base plate portion, said first engagement structure further effecting engagement of said tab with said retainer plate.

2. An apparatus as set forth in claim 1, further comprising a second expanding device for engaging a second side portion of said steering wheel cover and moving said second side portion outwardly.

3. An apparatus as set forth in claim 1, wherein said first expanding device comprises a reciprocating member and a pulling device which is connected to said reciprocating member for movement with said reciprocating member, said reciprocating member being adapted to move between a first position adjacent to said receiving nest and a second position away from said receiving nest, and said pulling device including a rotatable pulling member capable of rotating between an engagement position and a remote position such that said pulling member is adapted to engage and expand said first side portion when it is positioned in said engagement position and said reciprocating member is moved from said first position to said second position.

4. An apparatus as set forth in claim 3, wherein said first expanding device further includes a pneumatic cylinder unit connected to said reciprocating member for effecting movement of said reciprocating member between said first and second positions.

5. An apparatus as set forth in claim 3, wherein said pulling device further includes a rotary actuator coupled to said pulling member for effecting rotation of said pulling member between said engagement and remote positions.

6. An apparatus as set forth in claim 1, wherein said first side portion comprises a first inner side portion, and said steering wheel cover further includes second, third and fourth inner side portions and first, second, third and fourth outer side portions and further comprising second, third and fourth expanding devices for engaging said second, third and fourth inner side portions.

7. An apparatus as set forth in claim 6, wherein said first structure comprises an overhead press having a piston engagement member adapted to move toward said air bag device after said air bag device has been placed within said steering wheel cover pocket such that said piston engagement member engages and moves said base plate portion toward said central portion of said steering wheel cover to set the height of said base plate portion within said pocket;

said second structure comprises at least one side portion press device having a press device engagement member adapted to move between a side portion engagement position and a remote position, said press device engagement member moving said first outer side portion toward said air bag device as it moves to said side portion engagement position; and said piston engagement member further being adapted to move toward said nest after said retainer plate has been positioned over said moved base plate portion to effect locking engagement of said tab with said retainer plate.

8. An apparatus as set forth in claim 7, wherein said at least one side portion press device comprises a plurality of side portion press devices.

9. An apparatus as set forth in claim 7, wherein said engagement apparatus further comprises at least one tuck blade which is adapted to move inwardly toward a corner portion of said steering wheel cover to engage a section of said cushion portion extending out of said steering wheel cover pocket to push said extending cushion section into said pocket.

10. An apparatus as set forth in claim 7 wherein said overhead press further includes a piston/cylinder unit having a piston coupled to said piston engagement member and said apparatus further including a device for varying the pressure supplied to said overhead press piston/cylinder unit so as to vary the pressure which said engagement member applies to said retainer plate.

11. An apparatus as set forth in claim 1, further comprising optical sensor apparatus for sensing the presence or absence of one or more tabs on said steering wheel cover.

12. A method for assembling a steering wheel cover, an air bag device and a retainer plate into a single unit, said air bag device including an inflatable cushion portion and a base plate portion, said steering wheel cover including a central portion and a plurality of side portions which extend out from said central portion to define with said central portion a pocket for receiving said air bag device, and at least one of said side portions having a tab for lockingly engaging said retainer plate, said method comprising the steps of:

positioning said steering wheel cover on a nest;

moving a first steering wheel cover side portion outwardly;

placing said air bag device within said pocket;

moving at least one of said first side portion and another of said side portions inwardly toward said central portion of said steering wheel cover;

placing said retainer plate over said base plate portion of said air bag device; and effecting engagement of said tab with said retainer plate via a press.

13. A method as set forth in claim 12, further comprising the step of moving a second steering wheel cover side portion outwardly.

14. A method as set forth in claim 12, wherein said step of moving a first steering wheel cover side portion outwardly comprises the step of engaging said first steering wheel cover side portion with a pulling device and moving said pulling device away from said nest via a reciprocating member.

15. A method as set forth in claim 12, further comprising the steps of:

providing at least one tuck blade; and moving "said at least one tuck blade" inwardly toward a corner portion of said steering wheel cover to engage a section of said cushion portion extending out of said steering wheel cover pocket to push said extending cushion section into said steering wheel cover pocket.

16. A method as set forth in claim 12, further comprising the step of moving said base plate portion toward said central portion of said steering wheel cover before said step of placing a retainer plate over said base plate portion.

17. An apparatus for expanding a steering wheel cover to allow an air bag device to be placed within said steering wheel cover, said air bag device including an inflatable cushion portion and a base plate portion, said steering wheel cover including a central portion and a plurality of side portions which extend out from said central portion to define with said central portion a pocket for receiving said air bag device, said apparatus comprising:

a receiving nest adapted to receive said steering wheel cover; and a first expanding device for engaging a first side portion of said steering wheel cover and moving said first side portion outwardly to permit said air bag device to be manually placed within said pocket.

18. An apparatus as set forth in claim 17, further comprising a second expanding device for engaging a second side portion of said steering wheel cover and moving said second side portion outwardly.

19. An apparatus as set forth in claim 17, wherein said first expanding device comprises a reciprocating member and a pulling device which is connected to said reciprocating member for movement with said reciprocating member, said reciprocating member being adapted to move between a first position adjacent to said receiving nest and a second position away from said receiving nest, and said device including a rotatable pulling member capable of rotating between an engagement position and a remote position such that said pulling member is adapted to engage and expand said first side portion when it is positioned in said engagement position and said reciprocating member is moved from said first position to said second position.

20. An apparatus as set forth in claim 19, wherein said first expanding device further includes a pneumatic cylinder unit for effecting movement of said reciprocating member between said first and second positions.

21. An apparatus as set forth in claim 19, wherein said pulling device further includes a rotary actuator coupled to said pulling member for effecting rotation of said pulling member between said engagement and remote positions.

* * * * *